US009703143B2

(12) United States Patent
Tanabe

(10) Patent No.: US 9,703,143 B2
(45) Date of Patent: Jul. 11, 2017

(54) DISPLAY DEVICE

(71) Applicant: Funai Electric Co., Ltd., Daito, Osaka (JP)

(72) Inventor: Noritaka Tanabe, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 413 days.

(21) Appl. No.: 14/165,730

(22) Filed: Jan. 28, 2014

(65) Prior Publication Data

US 2014/0218894 A1 Aug. 7, 2014

(30) Foreign Application Priority Data

Feb. 5, 2013 (JP) .................................. 2013-020256

(51) Int. Cl.
*G02F 1/1335* (2006.01)

(52) U.S. Cl.
CPC .. *G02F 1/133611* (2013.01); *G02F 1/133603* (2013.01); *G02F 1/133605* (2013.01)

(58) Field of Classification Search
CPC ......... G02F 1/133615; G02F 1/133308; G02F 1/1336; G02F 1/133603; G02F 1/133605; G02F 1/133611; G02B 6/0046; G02B 6/0016; G02B 6/0028; G02B 5/3025; F21S 2/00
USPC ....................... 349/65, 58; 362/97.1; 348/739
See application file for complete search history.

(56) References Cited

U.S. PATENT DOCUMENTS 6,007,209 A * 12/1999 Pelka ..................... G01D 11/28
362/23.08
2008/0309849 A1 * 12/2008 Yang ............................... 349/65

FOREIGN PATENT DOCUMENTS

| EP | 1992871 A2 | 11/2008 |
| EP | 2426395 A1 | 3/2012 |
| EP | 2515027 A1 | 10/2012 |
| JP | 2009-116037 A | 5/2009 |
| JP | 2012-022779 A | 2/2012 |

OTHER PUBLICATIONS

Extended European Search Report of the corresponding European Application No. 14153645.8, dated May 27, 2014.

* cited by examiner

*Primary Examiner* — Stephen F Husar
(74) *Attorney, Agent, or Firm* — Global IP Counselors, LLP

(57) ABSTRACT

A display device includes a display component, a plurality of light sources, a flat optical member, a rear side support member, and a reflective sheet. The light sources are disposed on a rear side of the display device relative to the display component. The light sources irradiate the display component with light. The light sources are arranged with respect to the rear side support member such that among light emitted towards the display component from an edge-side light source that is disposed closest to an edge portion of the rear side support member out of the light sources, light emitted at a brightness that is at least half of an maximum brightness of the edge-side light source reaches an edge portion of the flat optical member corresponding to the edge portion of the rear side support member.

14 Claims, 5 Drawing Sheets

DISPLAY DEVICE

CROSS-REFERENCE TO RELATED APPLICATIONS

This application claims priority to Japanese Patent Application No. 2013-020256 filed on Feb. 5, 2013. The entire disclosure of Japanese Patent Application No. 2013-020256 is hereby incorporated herein by reference.

BACKGROUND

Field of the Invention

This invention generally relates to a display device. More specifically, the present invention relates to a display device having a plurality of light sources for irradiating a display component with light.

Background Information

Generally, display devices having a plurality of light sources for irradiating a display component with light are well-known (see Japanese Unexamined Patent Application Publication No. 2009-116037 (Patent Literature 1), for example).

The above-mentioned Patent Literature 1 discloses a liquid crystal display device having a plurality of fluorescent tubes (e.g., light sources) for irradiating a liquid crystal display panel (e.g., a display component) with light from the rear side, and a reflective sheet for reflecting light from the fluorescent tube toward the display component. With this liquid crystal display device, a diffuser sheet (e.g., a flat optical member) for diffusing light from the fluorescent tube toward the liquid crystal display panel is disposed between the fluorescent tube and the liquid crystal display panel. Also, a plurality of the fluorescent tubes are disposed, spaced apart, on the front of the reflective sheet.

SUMMARY

With the conventional liquid crystal display device disclosed in the above-mentioned Patent Literature 1, the number of fluorescent tubes is sometimes reduced in an effort to keep the cost down. For example, the fluorescent tubes disposed closest to the edge of the diffuser sheet is sometimes eliminated. However, it has been discovered that in this case, only the light from a fluorescent tube that is farther away from the edge of the diffuser sheet than the eliminated fluorescent tube (that is, the fluorescent tube that is the next closest to the edge of the diffuser sheet after the eliminated fluorescent tube) can reach the edges of the diffuser sheet. Thus, there is a pronounced drop in the brightness of the light reaching the edges of the diffuser sheet, which is a problem in that the edge of the display screen is displayed much darker.

One aspect is to provide a display device with an edge of a display screen is kept from being displayed markedly darker, even when the number of light sources is reduced and a distance between an edge of an optical member and a light source closest to the edge of the optical member becomes larger.

In view of the state of the known technology and in accordance with one aspect of the present disclosure, a display device is provided that includes a display component, a plurality of light sources, a flat optical member, a rear side support member, and a reflective sheet. The light sources are disposed on a rear side of the display device relative to the display component. The light sources are configured to irradiate the display component with light. The flat optical member is disposed between the display component and the light sources. The rear side support member supports the light sources and the flat optical member from the rear side. The reflective sheet is disposed on a front side of the display device relative to the rear side support member. The reflective sheet is configured to reflect the light from the light sources towards the display component. The light sources are arranged with respect to the rear side support member such that among light emitted towards the display component from an edge-side light source that is disposed closest to an edge portion of the rear side support member out of the light sources, light emitted at a brightness that is at least half of an maximum brightness of the edge-side light source reaches an edge portion of the flat optical member corresponding to the edge portion of the rear side support member.

Also other objects, features, aspects and advantages of the disclosed display device will become apparent to those skilled in the art from the following detailed description, which, taken in conjunction with the annexed drawings, discloses one embodiment of the display device.

BRIEF DESCRIPTION OF THE DRAWINGS

Referring now to the attached drawings which form a part of this original disclosure.

DETAILED DESCRIPTION OF EMBODIMENTS

A selected embodiment will now be explained with reference to the drawings. It will be apparent to those skilled in the art from this disclosure that the following descriptions of the embodiment are provided for illustration only and not for the purpose of limiting the invention as defined by the appended claims and their equivalents.

Referring to FIGS. 1 to 6, a liquid crystal television set 100 is illustrated in accordance with one embodiment. The liquid crystal television set 100 is an example of the "display device" of the present invention. In the illustrated embodiment, while the liquid crystal television set 100 is illustrated as an example of the display device, it will be apparent to those skilled in the art from this disclosure that the present invention can be applied to different types of display devices.

Figure 1:
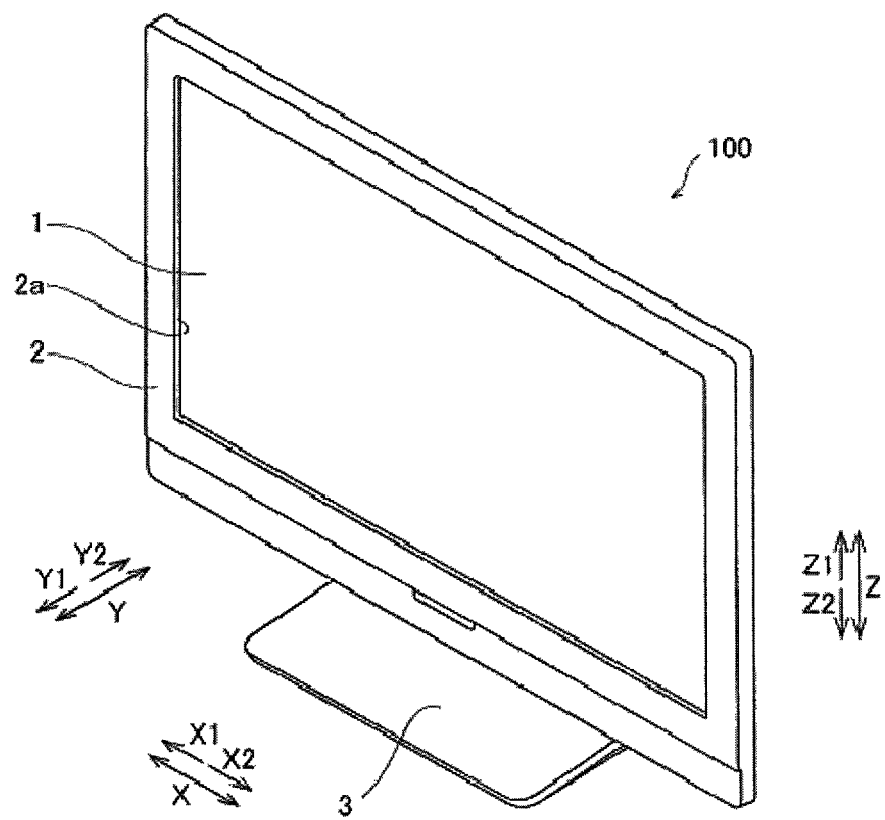
FIG. 1 is a front perspective view of the overall configuration of a liquid crystal television set in accordance with one embodiment.
Figure 2:
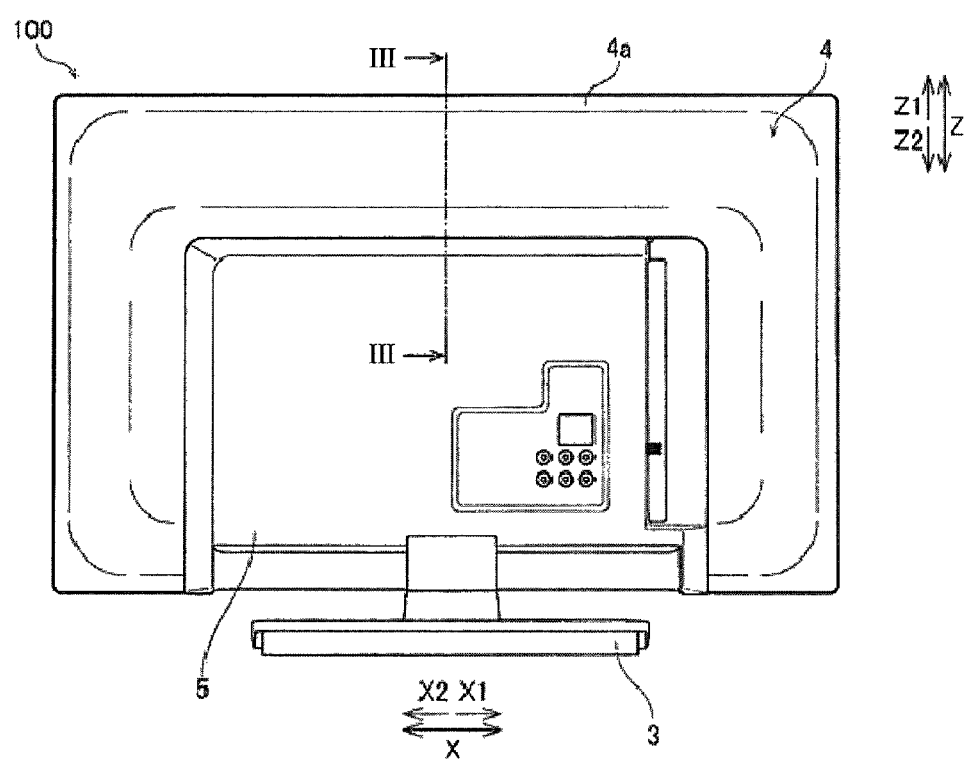
FIG. 2 is a rear elevational view of the liquid crystal television set shown in FIG. 1.
Figure 3:
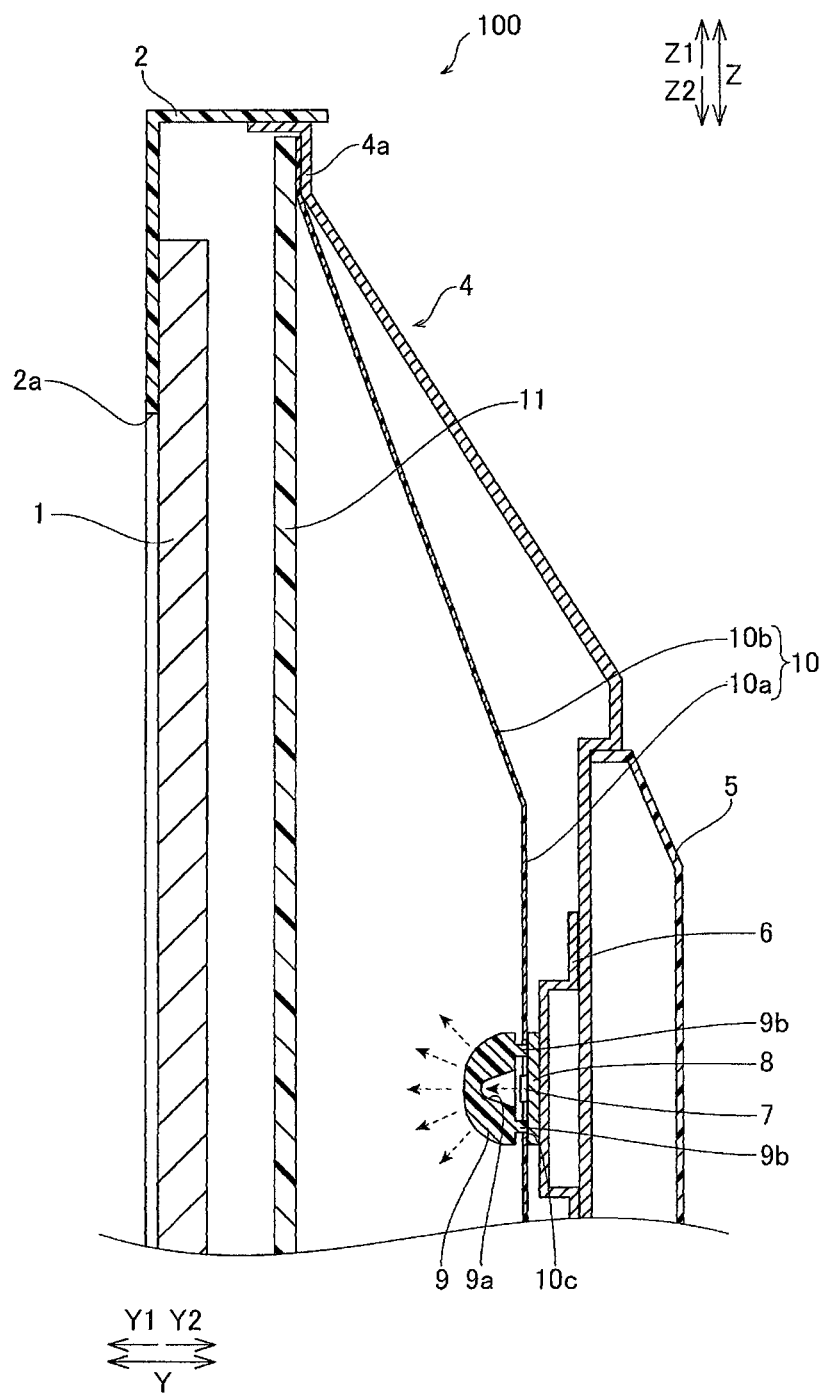
FIG. 3 is a detailed, partial cross sectional view of the liquid crystal television set, taken along line in FIG. 2.

As shown in FIGS. 1 and 2, the liquid crystal television set 100 includes a display component 1, a front housing 2, and a stand member 3. The display component 1 has liquid crystal cells that display video. In other words, the display component 1 includes a liquid crystal panel, for example. The front housing 2 is made of plastic and supports the display component 1 from the front side (the arrow Y1 direction side). The stand member 3 is made of plastic and supports the liquid crystal television set 100 from below (the arrow Z2 direction side). The front housing 2 is formed in the shape of a frame that is rectangular as seen from the front (as seen from the arrow Y1 direction side). More specifically, a rectangular opening 2a for exposing the display component 1 on the front side is provided near the center of the front housing 2. As shown in FIG. 3, the front housing 2 is formed in a concave shape that is recessed forward (the arrow Y1 direction). In the illustrated embodiment, while the display component 1 is illustrated as having liquid crystal cells, it will be apparent to those skilled in the art from this disclosure that the present invention can be applied to different types of display components.

As shown in FIGS. 2 and 3, the liquid crystal television set 100 further includes a rear frame 4 and a plastic cover member 5. The rear frame 4 is made of sheet metal and supports the display component 1 from the rear face side (e.g., the rear side) (the arrow Y2 direction side). This rear frame 4 has a rectangular edge 4a that fits into the rear face side of the front housing 2. Also, the rear frame 4 is formed in a concave shape that is recessed rearward (in the arrow Y2 direction). The rear frame 4 is fixed to the front housing 2 by fastening members (not shown). The cover member 5 has a rectangular shape that is smaller than the rear frame 4. The cover member 5 is disposed on the rear face side of the rear frame 4. The cover member 5 is provided so as to cover the various kinds of board (not shown), such as a power supply board or a signal processing board, that are disposed on the rear face of the rear frame 4. The cover member 5 is fixed to the rear frame 4 by fastening members (not shown). The rear frame 4 and the cover member 5 form a rear housing corresponding to the front housing 2. The rear frame 4 is an example of the "rear side support member" of the present invention.

Figure 4:
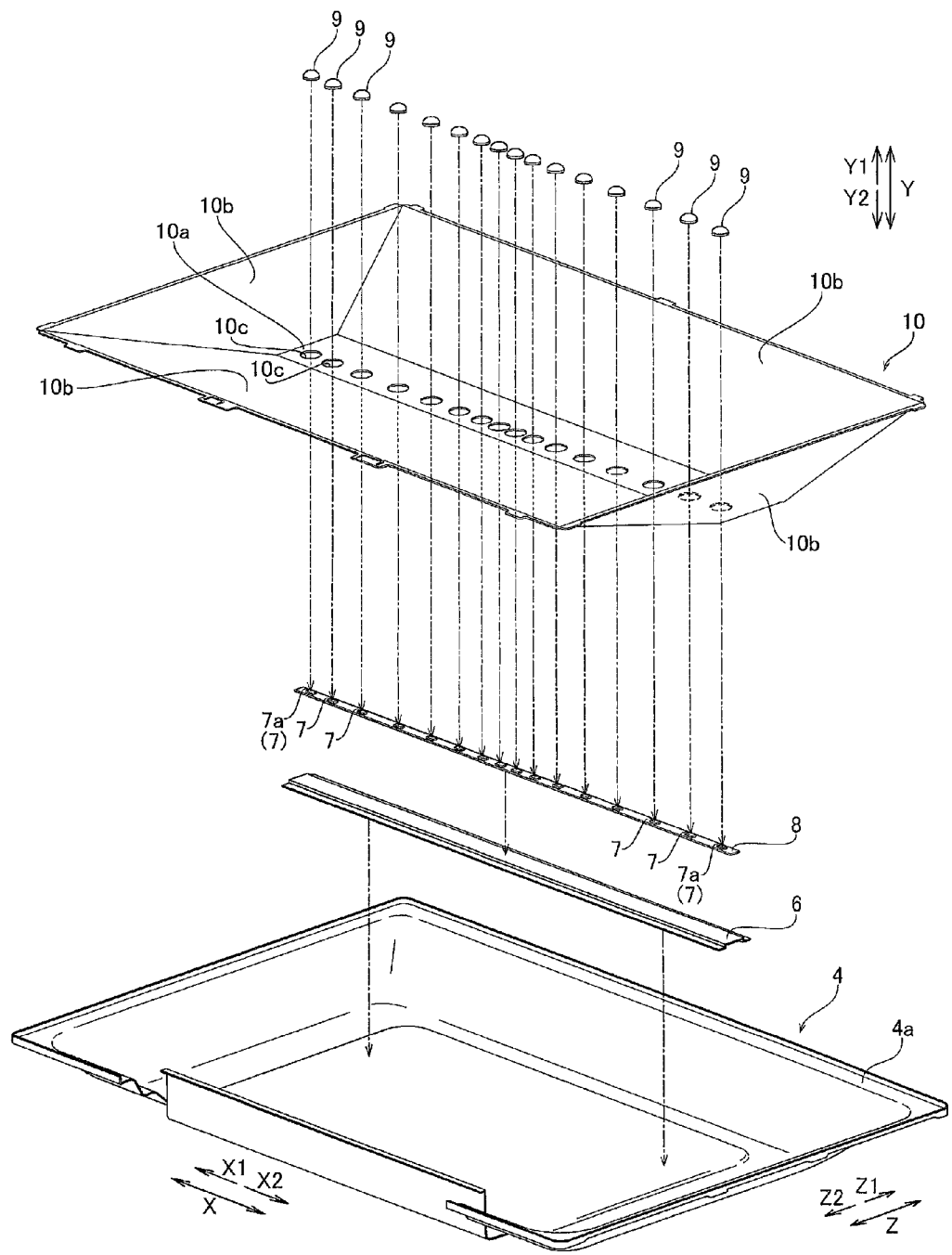
FIG. 4 is an exploded perspective view of the liquid crystal television set shown in FIG. 1, illustrating a rear frame, a heat sink, a LED substrate, a reflective sheet, and a plurality of diffusing lens of the liquid crystal television set.

As shown in FIG. 3, the liquid crystal television set 100 further includes a sheet metal heat sink 6, a plurality of light sources 7, a substrate 8, a plurality of diffusing lenses 9, a reflective sheet 10, and a plastic diffuser plate 11. The sheet metal heat sink 6 is disposed on the front of the rear frame 4 (the face on the arrow Y1 direction side). The light sources 7 irradiate the display component 1 with light from the rear face side (the arrow Y2 direction side). The light sources 7 are disposed on the substrate 8. The substrate 8 is disposed on the front of this heat sink 6. The light sources 7 are made up of while LEDs (light emitting diodes) or the like. As shown in FIG. 4, the light sources 7 are mounted on the front of the substrate 8, spaced apart in the direction in which the substrate 8 extends (the X direction). In the illustrated embodiment, while the light sources 7 are illustrated as LEDs, it will be apparent to those skilled in the art from this disclosure that the light sources 7 can be different types of light sources.

As shown in FIGS. 3 and 4, the diffusing lenses 9 respectively cover the light sources 7. The diffusing lenses 9 are attached to the front of the substrate 8 where the plurality of light sources 7 are mounted (the face on the arrow Y1 direction side). These diffusing lenses 9 are made of acrylic or another such plastic, and have the function of diffusing light emitted by the light sources 7 to the display component 1 side (see the dotted arrows in FIG. 3). As shown in FIG. 3, concave components 9a are provided near the center of the bottom face of the diffusing lenses 9 (at positions corresponding to the light sources 7 on the surface of the substrate 8). The diffusing lenses 9 are provided with columnar bosses 9b that extend from the bottom faces of the diffusing lenses 9 to the substrate 8 side. These bosses 9b are adhesively bonded to the front of the substrate 8, thereby attaching the diffusing lenses 9 at positions corresponding to the light sources 7 on the front of the substrate 8.

Figure 5:
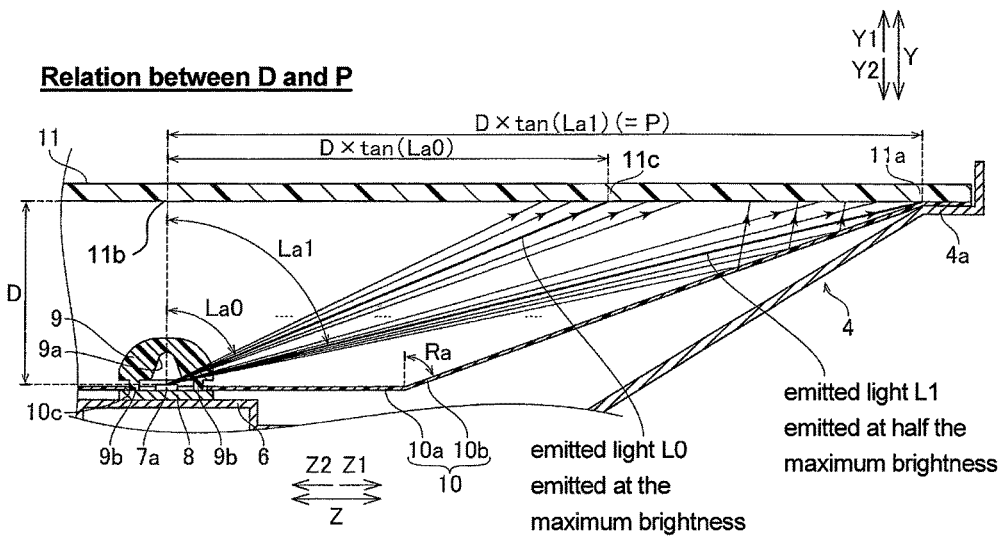
FIG. 5 is a detailed, partial cross sectional view of the liquid crystal television set, illustrating the relation between the distance between a diffuser plate and edge-side light sources, and the distance between an edge of the diffuser plate and a portion of the diffuser plate corresponding to the edge-side light sources.

As shown in FIGS. 3 and 4, the reflective sheet 10 is made of plastic and reflects light from the light sources 7 to the display component 1 side. The reflective sheet 10 is disposed between the substrate 8 and the diffusing lenses 9. This reflective sheet 10 has a shape that conforms to the rear frame 4 (a concave shape that is recessed to the arrow Y2 direction side) in a state of being disposed on the front of the substrate 8. More specifically, as shown in FIG. 4, the reflective sheet 10 includes a rectangular bottom face part 10a that extends in the left and right direction (X direction), and four sloped parts 10b disposed so as to surround the four sides of the bottom face part 10a. As shown in FIG. 3, the bottom face part 10a is formed so as to extend parallel to the diffuser plate 11 (discussed below). The sloped parts 10b are formed so as to extend at an angle from the ends of the bottom face part 10a toward the edge 4a of the rear frame 4. As shown in FIGS. 4 and 5, a plurality of holes 10c corresponding to the plurality of light sources 7 (diffusing lenses 9) are provided in a straight line, spaced apart in the left and right direction (X direction).

As shown in FIG. 3, the diffuser plate 11 further diffuses light diffused by the diffusing lenses 9 toward the display component 1. The diffuser plate 11 is disposed between the reflective sheet 10 and the display component 1 (between the light sources 7 and the display component 1). This diffuser plate 11 has a rectangular shape corresponding to the rectangular edge 4a of the rear frame 4. Specifically, the diffuser plate 11 is formed in a rectangular shape that extends in the up and down direction (Z direction) and the left and right direction (X direction). The diffuser plate 11 is an example of the "flat optical member" of the present invention.

In this embodiment, the configuration is such that among the light emitted from the edge-side light sources 7a toward the display component 1 (see the straight lines with the triangular arrowheads in FIG. 5), the light emitted at a brightness that is at least half the maximum brightness and less than the maximum brightness reaches the edge 11a of the diffuser plate 11 corresponding to the edge 4a of the rear frame 4. The edge-side light sources 7a are the light sources 7 (among the plurality of light sources 7) disposed closest to the edge 4a (or left and right edges) of the rear frame 4 (the light sources 7 disposed near the two ends of the substrate 8 in the left and right direction (X direction). The "light emitted at a brightness that is at least half the maximum brightness and less than the maximum brightness" is light emitted at a position that is on the outside (on the rear frame 4 side; the arrow Z1 direction side) of emitted light L0 emitted at the maximum brightness (see FIG. 5) and on the inside (the opposite side from the rear frame 4 side; the arrow Z2 direction side) of emitted light L1 emitted at a brightness that is half the maximum brightness (see FIG. 5). Also, the "light emitted at a brightness that is at least half the maximum brightness and less than the maximum brightness" is light emitted at an emission angle that is over the angle La0 and no more than the angle La1, when the angle La0 (see FIG. 5) is the emission angle of the emitted light L0 emitted at the maximum brightness (the angle with respect to the direction perpendicular to the diffuser plate 11 (Y direction)), and the angle La1 (see FIG. 5) is the emission angle of the emitted light L1 emitted at a brightness that is less than the maximum brightness. In other words, the angle La1 is also called a half-power angle Also, in this embodiment, the distance D (see FIG. 5) between the edge-side light sources 7a and the diffuser plate 11 in the longitudinal direction (Y direction), and the distance P (see FIG. 5) between the edge 11a and the portion 11b of the diffuser plate 11 corresponding to the edge-side light sources 7a are set so as to satisfy the following formula (1) in regards to the emission angles La0 and La1 (see FIG. 5). FIG. 5 is a diagram of when P=D×tan(La1).

$$D \times \tan(La0) < P \leq D \times \tan(La1) \quad (1)$$

In the illustrated embodiment, the angle La1 is also defined as a half-power angle $\theta \frac{1}{2}$ of the luminous intensity (or brightness) of the light sources 7, while the distance D×tan (La1) is also defined as a half width at half maximum of the luminous intensity (or brightness) of the light sources 7. Of course, the angle La1 can be set differently. For example, the angle La1 can be set as an angle outside of which the luminous intensity of the light sources 7 becomes lower than a predetermined luminous intensity (or brightness), such as 60% luminous intensity, 50% luminous intensity, 40% luminous intensity. In the illustrated embodiment, "the maximum brightness" does not necessarily mean the axial luminous intensity of the light sources 7. The "maximum brightness" can mean the luminous intensity that is higher than a predetermined luminous intensity, such as 85% luminous intensity, 90% luminous intensity, 95% luminous intensity, and the like. In other words, in this case, the distance D×tan(La0) can be defined as a distance defining an area within which the luminous intensity of the light from the edge-side light source 7a at the diffuser plate 11 is higher than the predetermined luminous intensity (or brightness). As shown in FIG. 5, the distance D×tan(La0) is a distance measured in Z direction between the position 11b of the diffuser plate corresponding to the edge-side light source 7a and the position 11c of the diffuser plate 11 at which the light L0 intersect with the diffuser plate 11.

Figure 6:
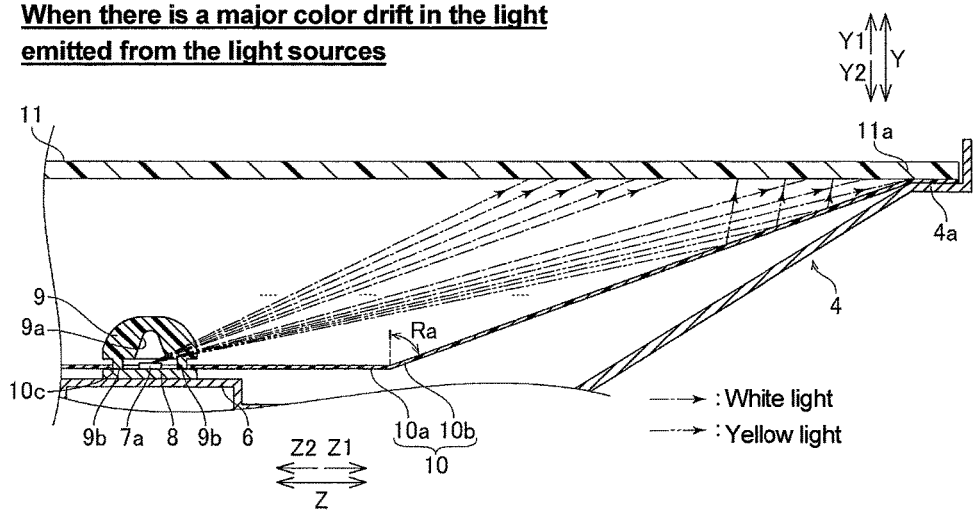
FIG. 6 is a detailed, partial cross sectional view of the liquid crystal television set, illustrating a state in which white light and yellow light are emitted from the edge-side light sources when there is a major color drift in the light emitted from the edge-side light sources.

Also, in this embodiment, the inclination angle Ra (see FIGS. 5 and 6) of the sloped parts 10b with respect to the direction perpendicular to the bottom face part 10a (Y direction) is set so as to satisfy the following formulas (2) and (3). FIGS. 5 and 6 are diagrams of when the inclination angle Ra is approximately 60°.

$$40° \leq Ra \leq La0 \quad (2)$$

$$50° \leq Ra \leq La0 \quad (3)$$

As shown in FIG. 5, in this embodiment, the configuration is such that of the light emitted from the edge-side light sources 7a (see the straight lines with the triangular arrowheads in FIG. 5), the light emitted at a position that is outside (on the arrow Z1 direction side) of the emitted light L1 emitted at a brightness that is half the maximum brightness reaches the edge 11a of the diffuser plate 11 after being reflected by the sloped parts 10b.

Also, in this embodiment, the inclination angle Ra of the sloped parts 10b is set as discussed above, as shown in FIG. 6. Thus, even if there is a major color drift in the light emitted from the edge-side light sources 7a (that is, even if the edge-side light sources 7a emit white light (see the one-dot chain lines with the triangular arrowheads in FIG. 6) and yellow light located outside (on the arrow Z1 direction side) of white light (see the two-dot chain lines with the triangular arrowheads in FIG. 6)), then the yellow light can be mixed with the white light at the edge 11a of the diffuser plate 11 after being reflected by the sloped parts 10b. White light is an example of the "light of a first color" in the present invention, while yellow light is an example of "light of a second color."

In this embodiment, as discussed above, the liquid crystal television set 100 is configured so that among the light emitted toward the display component 1 from the edge-side light sources 7a disposed at the positions closest to the edge 4a of the rear frame 4 (out of the plurality of light sources 7) (see the straight lines with the triangular arrowheads in FIG. 5), the light emitted at a brightness that is at least half the maximum brightness and is less than the maximum brightness (in FIG. 5, emitted light located on the outside (the arrow Z1 direction side) of the emitted light L0 emitted at the maximum brightness and on the inside (the arrow Z2 direction side) of the emitted light L1 emitted at a brightness that is half the maximum brightness) reaches the edge 11a of the diffuser plate 11 corresponding to the edge 4a of the rear frame 4. Consequently, even though the number of light sources 7 is reduced and the distance is increased between the edge 11a of the diffuser plate 11 and the light sources 7 that are closest to the edge 11a of the diffuser plate 11, of the light emitted from the edge-side light sources 7a, the light emitted at a brightness that is at least half the maximum brightness and less than the maximum brightness will reach the edge 11a of the diffuser plate 11. As a result, even though the number of light sources 7 is reduced and the distance is increased between the edge 11a of the diffuser plate 11 and the light sources 7 that are closest to the edge 11a of the diffuser plate 11, the brightness of light reaching the edge of the optical member is kept from being markedly decreased. Thus, the edge of the display screen is kept from being displayed much darker. As a result, the display screen will not look odd to the viewer. Also, since the light reaching the edge 11a of the diffuser plate 11 is diffused by the edge 11a of the diffuser plate 11, the edge of the display screen is effectively prevented from being displayed much darker.

Also, in this embodiment, as discussed above, the distance D (see FIG. 5) between the edge-side light sources 7a and the diffuser plate 11 in the longitudinal direction (Y direction), and the distance P (see FIG. 5) between the edge 11a and the portion 11b of the diffuser plate 11 corresponding to the edge-side light sources 7a are set so as to satisfy the following formula (1). FIG. 5 is a diagram of when P=D×tan(La1).

$$D \times \tan(La0) < P \leq D \times \tan(La1) \quad (1)$$

In the formula (1) above, La0 is the angle of the emitted light L0 (see FIG. 5) emitted at the maximum brightness, out of the light emitted from the edge-side light sources 7a toward the display component 1 side, with respect to a direction that is perpendicular to the diffuser plate 11. La1 is the angle of emitted light L1 (see FIG. 5) emitted at half the maximum brightness, out of the light emitted from the edge-side light sources 7a toward the display component 1 side, with respect to a direction that is perpendicular to the diffuser plate 11.

If the distances D and P are thus set, then even though the number of light sources 7 is reduced and the distance is increased between the edge 11a of the diffuser plate 11 and the light sources 7 that are closest to the edge 11a of the diffuser plate 11, out of the light emitted from the edge-side light sources 7a, the light that is emitted at a brightness that is at least half the maximum brightness and less than the maximum brightness (light emitted at an emission angle that is over La0 and no more than La1 in FIG. 5) will easily be able to reach the edge 11a of the diffuser plate 11.

Also, in this embodiment, as discussed above, the inclination angle Ra (see FIGS. 5 and 6) of the sloped parts 10b with respect to the direction perpendicular to the bottom face part 10a (Y direction) is set so that the reflected light emitted from the edge-side light sources 7a and reflected by the sloped parts 10b will reach the edge 11a of the diffuser plate 11 corresponding to the edge 4a of the rear frame 4. If the inclination angle Ra is thus set, as shown in FIG. 5, even light emitted from the edge-side light sources 7a on the outside (the arrow Z1 direction side) of the edge 11a of the diffuser plate 11 (in FIG. 5, light emitted more to the outside than L1) will reach the edge 11a of the diffuser plate 11 after being reflected by the sloped parts 10b. Thus, more light reaches the edge 11a of the diffuser plate 11. Consequently, the edge of the display screen is more effectively prevented from being displayed much darker.

Also, in this embodiment, as discussed above, the inclination angle Ra of the sloped parts (see FIGS. 5 and 6) is set so as to satisfy the following formulas (2) and (3). FIGS. 5 and 6 are diagrams of when the inclination angle Ra is approximately 60°.

$$40° \leq Ra \leq La0 \quad (2)$$

$$50° \leq Ra \leq La0 \quad (3)$$

When the inclination angle Ra is thus set, the sloped parts can easily and reliably reflect the light emitted from the edge-side light sources 7a to the outside (the arrow Z1 direction side) of the edge 11a of the diffuser plate 11 so that the light reaches the edge 11a of the diffuser plate 11.

Also, in this embodiment, as discussed above, the inclination angle Ra of the sloped parts 10b with respect to a direction (Y direction) perpendicular to the bottom face part 10a is set so that when the edge-side light sources 7a emit light that includes white light (see the one-dot chain lines with the triangular arrowheads in FIG. 6) and yellow light located outside (on the arrow Z1 direction side) of white light (see the two-dot chain lines with the triangular arrowheads in FIG. 6) (that is, when there is a major color drift in the light emitted from the edge-side light sources 7a), the yellow light located on the outside can be mixed with the white light at the edge 11a of the diffuser plate 11 corresponding to the edge 4a of the rear frame 4. If the inclination angle Ra is thus set, then even though there is a major color drift in the light emitted from the edge-side light sources 7a, the sloped parts 10b can easily reflect the yellow light so that it mixes with the white light at the edge 11a of the diffuser plate 11 corresponding to the edge 4a of the rear frame 4, which means that there is less color unevenness.

The embodiment disclosed herein is just an example in every respect, and should not be interpreted as being limiting in nature. The scope of the invention being indicated by the appended claims rather than by the above description of the embodiment, all modifications within the meaning and range of equivalency of the claims are included.

For example, in the above embodiment, a television set is illustrated as the display device of the present invention. However, the present invention is not limited to this. The present invention can be applied not only to a television set, but also any normal display device such as one that is used for a PC (personal computer).

Also, in this embodiment, a plastic diffuser plate is used as the flat optical member of the present invention. However, the present invention is not limited to this. Some flat optical member other than a plastic diffuser plate can be used in the present invention.

Also, in this embodiment, there is only one substrate, on which a plurality of light sources are mounted in a straight line. However, the present invention is not limited to this. With the present invention, two or more substrates can be provided on which a plurality of light sources are mounted in a straight line. In this case, the configuration can be such that of the plurality of light sources, the four light sources disposed closest to the four corners of the diffuser plate serve as the edge-side light sources, and the light emitted from these four edge-side light sources at a brightness that is at least half the maximum brightness and is less than the maximum brightness reaches the four corners of the diffuser plate.

Also, in this embodiment, the distance D between the edge-side light sources and the diffuser plate, and the distance P between the edge and the portion of the diffuser plate corresponding to the edge-side light sources are set so as to satisfy the relational formula P=D×tan(La1) (see FIG. 5). However, the present invention is not limited to this. With the present invention, the distances D and P should satisfy the relational formula D×tan(La0)<P×tan(La1) defined by the above-mentioned formula (1). In particular, in the illustrated embodiment, as shown in FIG. 5, the left or right edge of the diffuser plate 11 and the left or right sloped part 10b are illustrated as being configured to satisfy the formula (1) for simplifying the illustration. However, of course, the upper or lower edge of the diffuser plate 11 and the upper or lower sloped part 10b can also be configured to satisfy the formula (1) in regards to the light sources 7 as viewed in Z1 or Z2 direction.

Also, in this embodiment, the inclination angle Ra of the sloped parts with respect to a direction perpendicular to the bottom face part of the reflective sheet is approximately 60° (see FIGS. 5 and 6). However, the present invention is not limited to this. With the present invention, the inclination angle Ra of the sloped parts should satisfy the relational formula 40°≤Ra≤La0 defined by the above-mentioned formula (2), and the 50°≤Ra≤La0 defined by the above-mentioned formula (3). In particular, in the illustrated embodiment, as shown in FIGS. 5 and 6, the left or right sloped part 10b is illustrated as being configured to satisfy the formula (2) or (3) for simplifying the illustration. However, of course, the upper or lower sloped part 10b can also be configured to satisfy the formula (2) or (3) in regards to the light sources 7 as viewed in Z1 or Z2 direction.

In the illustrated embodiment, the display device includes a display component, a plurality of light sources, a flat optical member, a rear side support member, and a reflective sheet. The light sources are disposed on the rear side of the display device relative to the display component. The light sources are configured to irradiate the display component with light. The flat optical member is disposed between the display component and the light sources. The rear side support member supports the light sources and the flat optical member from the rear side. The reflective sheet is disposed on a front side of the display device relative to the rear side support member. The reflective sheet is configured to reflect the light from the light sources towards the display component. The light sources being arranged with respect to the rear side support member such that among light emitted from an edge-side light source that is disposed closest to an edge portion of the rear side support member out of the plurality of light sources, light emitted at a brightness that is at least half of an maximum brightness of the edge-side light source reaches an edge portion of the flat optical member corresponding to the edge portion of the rear side support member.

With this display device, even if the number of the light sources has been reduced and the distance between the edge portion of the optical member and one of the light sources that is closest to the edge portion of the optical member has been increased, of the light emitted from the edge-side light source, the light emitted at the brightness that is at least half the maximum brightness and less than the maximum brightness reaches the edge portion of the flat optical member. Consequently, even if the number of light sources is reduced and the distance is increased between the edge portion of the optical member and one of the light sources that is closest to the edge portion of the optical member, there will not be a marked decrease in the brightness of the light reaching the edge portion of the optical member. Thus, the edge of the display component or screen is kept from being displayed much darker. As a result, the display screen does not look odd to the viewer.

With the display device, the flat optical member can include a diffuser plate that is configured to diffuse the light from the light sources towards the display component. The light sources can be arranged with respect to the rear side support member such that among the light emitted from the edge-side light source, the light emitted at the brightness that is at least half of the maximum brightness reaches an edge portion of the diffuser plate corresponding to the edge portion of the rear side support member. With this configuration, even if the number of light sources has been reduced and the distance has been increased between the edge portion of the optical member and one of the light sources that is closest to the edge portion of the optical member, of the light emitted from the edge-side light source, the light emitted at the brightness that is at least half of the maximum brightness (and less than the maximum brightness) can reach the edge portion of the diffuser plate and be diffused. This effectively prevents the edge portion of the display screen from being displayed much darker.

With the display device, the the light sources can be arranged with respect to the rear side support member such that the following relation (1) is satisfied:

$$D \times \tan(La0) < P \leq D \times \tan(La1) \quad (1).$$

In the above relation (1), D is a distance measured in a first direction of the display device between the edge-side light source and the flat optical member. P is a distance measured in a second direction of the display device between a portion of the flat optical member corresponding to the edge-side light source and the edge portion of the flat optical member. $La0$ is an angle of the light emitted at the maximum brightness from the edge-side light source with respect to the first direction of the display device. $La1$ is an angle of the light emitted at half of the maximum brightness from the edge-side light source with respect to the first direction of the display device.

If the distances D and P are thus set, then even if the number of light sources has been reduced and the distance has been increased between the edge portion of the optical member and one of the light sources that is closest to the edge portion of the optical member, out of the light emitted from the edge-side light sources, the light that is emitted at the brightness that is at least half the maximum brightness and less than the maximum brightness will easily be able to reach the edge portion of the flat optical member. In the illustrated embodiment, the first direction (e.g., Y direction) is perpendicular to the second direction (e.g., X direction or Z direction).

In this case, the reflective sheet can includes a bottom face part and a sloped part. The bottom face part extends parallel to the flat optical member. The sloped part extends from an edge of the bottom face part towards the edge portion of the rear side support member at an inclination angle Ra with respect to the first direction of the display device. The inclination angle Ra of the sloped part is set such that the light emitted from the edge-side light source and reflected by the sloped part reaches the edge portion of the flat optical member. If the inclination angle Ra is thus set, then even the light emitted to the outside of the edge portion of the flat optical member from the edge-side light source will reach the edge portion of the flat optical member after being reflected by the sloped part. Thus, a large quantity of light will reach the edge portion of the flat optical member. This more effectively reduces the likelihood that the edge portion of the display screen will be displayed much darker.

With the display device, the inclination angle Ra of the sloped part can be set to satisfy the following relation (2).

$$40° \leq Ra \leq La0 \quad (2)$$

If the inclination angle Ra is thus set, then light emitted to the outside of the edge portion of the flat optical member from the edge-side light source will be reflected by the sloped parts so as to reach the edge portion of the flat optical member.

In this case, the inclination angle Ra of the sloped part can be set to satisfy the following relation (3).

$$50° \leq Ra \leq La0 \quad (3)$$

If the inclination angle Ra is thus set, then light emitted to the outside of the edge portion of the flat optical member from the edge-side light source will be reflected more reliably by the sloped part so as to reach the edge of the flat optical member.

With the display device, the light emitted from the edge-side light source can include a first color light and a second color light with the second color light having a different color from the first color light and being located outside the first color light. The inclination angle Ra of the sloped part can be set such that the second color light is mixed with the first color light at the edge portion of the flat optical member. If the inclination angle Ra is thus set, then even if there is a major color drift in the light emitted from the edge-side light source (that is, if the edge-side light source emit light including light of a first color and light of a second color that is located to the outside of the light of the first color), the light of the second color can be easily reflected so that it mixes with the light of the first color at the edge portion of the flat optical member corresponding to the edge portion of the rear face side support member. Thus, color unevenness can be reduced.

With the display device, the inclination angle Ra of the sloped part can be set such that the second color light is mixed with the first color light at the edge of the flat optical member after the second color light is reflected by the sloped part.

With the display device, the light sources can be arranged with respect to the rear side support member such that the first color light directly reaches the edge portion of the flat optical member.

With the display device, the first color light can include a white color light, and the second color light can include a yellow color light.

With the present invention, as discussed above, the edge portion of a display screen is kept from being displayed markedly darker, even when the number of light sources has been reduced so that there is a greater distance between the edge portion of the optical member and one of the light sources closest to the edge portion of the optical member.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a display device in an upright position. Accordingly, these directional terms, as utilized to describe a display device should be interpreted relative to a display device in an upright position on a horizontal surface. The terms "left" and "right" are used to indicate the "right" when referencing from the right side as viewed from the front side of the display device, and the "left" when referencing from the left side as viewed from the front side of the display device.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only a selected embodiment has been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiment according to the present invention are provided for illustration only, and not for the purpose of limiting the invention as defined by the appended claims and their equivalents.

What is claimed is:

1. A display device comprising:
    a display component;
    a plurality of light sources arranged relative to the display component, the light sources irradiating the display component with light, the light sources overlapping with a display surface of the display component as viewed in a normal direction of the display surface of the display component, the light sources forming point light sources, respectively;
    an optical member disposed between the display component and the light sources; and
    a support member supporting the light sources and the optical member,
    a predetermined light source of the light sources being arranged with respect to the support member at a location where light emitted from the predetermined light source along a shortest optical path of optical paths that direct from the predetermined light source to an edge portion of the optical member has a brightness that is equal to or more than half of a maximum brightness of the predetermined light source and less than the maximum brightness of the predetermined light source, with the edge portion of the optical member corresponding to an edge portion of the support member.

2. The display device according to claim 1, further comprising
    a reflective member arranged relative to the support member, the reflective member reflecting the light emitted from the light sources towards the display component.

3. The display device according to claim 2, wherein
    the reflective member includes a bottom face part and a sloped part, the bottom face part extending parallel to the optical member, the sloped part extending from an edge of the bottom face part towards the edge portion of the support member at an inclination angle Ra with respect to the first direction of the display device, and
    the inclination angle Ra of the sloped part is set with the light emitted from the predetermined light source and reflected by the sloped part reaching the edge portion of the optical member.

4. The display device according to claim 3, wherein
    the inclination angle Ra of the sloped part is set to satisfy the following relation (2)

$$40° \leq Ra \leq La0 \qquad (2).$$

5. The display device according to claim 4, wherein
    the inclination angle Ra of the sloped part is further set to satisfy the following relation (3)

$$50° \leq Ra \leq La0 \qquad (3).$$

6. The display device according to claim 3, wherein
the light emitted from the predetermined light source includes a first color light and a second color light with the second color light having a different color from the first color light and being located outside the first color light, and
the inclination angle Ra of the sloped part is set with the second color light being mixed with the first color light at the edge portion of the optical member.

7. The display device according to claim 6, wherein
the inclination angle Ra of the sloped part is set with the second color light being mixed with the first color light at the edge of the flat optical member after the second color light is reflected by the sloped part.

8. The display device according to claim 7, wherein
the light sources are arranged with respect to the support member with the first color light directly reaching the edge portion of the optical member.

9. The display device according to claim 6, wherein
the first color light includes a white color light, and
the second color light includes a yellow color light.

10. The display device according to claim 1, wherein
the predetermined light source is an edge-side light source that is disposed closest to the edge portion of the support member out of the light sources.

11. A display device comprising:
a display component;
a plurality of light sources arranged relative to the display component, the light sources irradiating the display component with light;
a optical member disposed between the display component and the light sources;
a support member supporting the light sources and the optical member; and
the light sources being arranged with respect to the support member, among light emitted from a predetermined light source of the light sources, light emitted at a brightness that is equal to or more than half of a maximum brightness of the predetermined light source and less than the maximum brightness of the predetermined light source reaches an edge portion of the optical member corresponding to an edge portion of the support member,
the light sources being arranged with respect to the support member with the following relation (1) being satisfied:

$$D \times \tan(La0) < P \leq D \times \tan(La1) \qquad (1)$$

where D is a distance measured in a first direction of the display device between the predetermined light source and the optical member, P is a distance measured in a second direction of the display device between a portion of the optical member corresponding to the predetermined light source and the edge portion of the optical member, $La0$ is an angle of the light emitted at the maximum brightness from the predetermined light source with respect to the first direction of the display device, and $La1$ is an angle of the light emitted at half of the maximum brightness from the predetermined light source with respect to the first direction of the display device.

12. The display device according to claim 11, wherein
the optical member includes a diffuser plate that diffuses the light emitted from the light sources towards the display component, and
the light sources are arranged with respect to the support member, among the light emitted from the predetermined light source, the light emitted at the brightness that is at least half of the maximum brightness reaches an edge portion of the diffuser plate corresponding to the edge of the support member.

13. The display device according to claim 11, further comprising
a reflective member arranged relative to the support member, the reflective member reflecting the light emitted from the light sources towards the display component.

14. The display device according to claim 11, wherein
the predetermined light source is an edge-side light source that is disposed closest to the edge portion of the support member out of the light sources.

* * * * *